United States Patent [19]

Urbanek

[11] Patent Number: 6,068,463
[45] Date of Patent: May 30, 2000

[54] INJECTION MOLDING MACHINE

[75] Inventor: Otto Urbanek, Linz, Austria

[73] Assignee: Engel Maschinebau Gesellschaft m.b.H., Schwertberg, Austria

[21] Appl. No.: 09/053,265

[22] Filed: Apr. 1, 1998

[51] Int. Cl.[7] .................................................. B29C 45/76
[52] U.S. Cl. ........................ 425/169; 100/99; 100/231; 100/258 A; 425/451.9; 425/595
[58] Field of Search .................................. 425/149, 169, 425/170, 451.9, 589, 595; 100/46, 99, 231, 258 A

[56] References Cited

U.S. PATENT DOCUMENTS

| | | | |
|---|---|---|---|
| 4,408,520 | 10/1983 | Wons et al. | 100/46 |
| 4,685,876 | 8/1987 | Loscei | 425/170 |
| 5,249,951 | 10/1993 | Leonhartsberger et al. | 425/589 |
| 5,354,196 | 10/1994 | Ziv-Av | 425/589 |
| 5,556,656 | 9/1996 | Lampl et al. | 425/589 |
| 5,633,024 | 5/1997 | Ziv-Av | 425/595 |
| 5,650,182 | 7/1997 | Fuller et al. | 425/595 |
| 5,700,502 | 12/1997 | Hehl | 425/595 |
| 5,762,984 | 6/1998 | Wimbauer | 425/595 |
| 5,783,231 | 7/1998 | Fuller et al. | 425/595 |
| 5,800,843 | 9/1998 | Kappelmuller et al. | 425/589 |
| 5,846,574 | 12/1998 | Wohlrab | 425/149 |

FOREIGN PATENT DOCUMENTS

| | | |
|---|---|---|
| 9802291 | 7/1997 | Austria . |
| 0311133 | 10/1988 | European Pat. Off. . |
| 0448504 | 3/1991 | European Pat. Off. . |
| 0726131 | 2/1996 | European Pat. Off. . |
| 0754534 | 7/1996 | European Pat. Off. . |

OTHER PUBLICATIONS

European Search Report, Application No. EP 98 10 6012.

*Primary Examiner*—James P. Mackey
*Attorney, Agent, or Firm*—Notaro & Michalos P.C.

[57] ABSTRACT

An injection molding machine has a frame which is C-shaped viewed from the side, the legs of which are pushed apart at their free ends by the effect of the locking force, wherein the two die platens associated with the legs are thereby kept parallel, in that pivoting takes place between at least one die platen and the associated leg. According to the invention, a measuring device is provided for permanent monitoring of the rotation and distortion of the joint providing the pivoting.

4 Claims, 2 Drawing Sheets

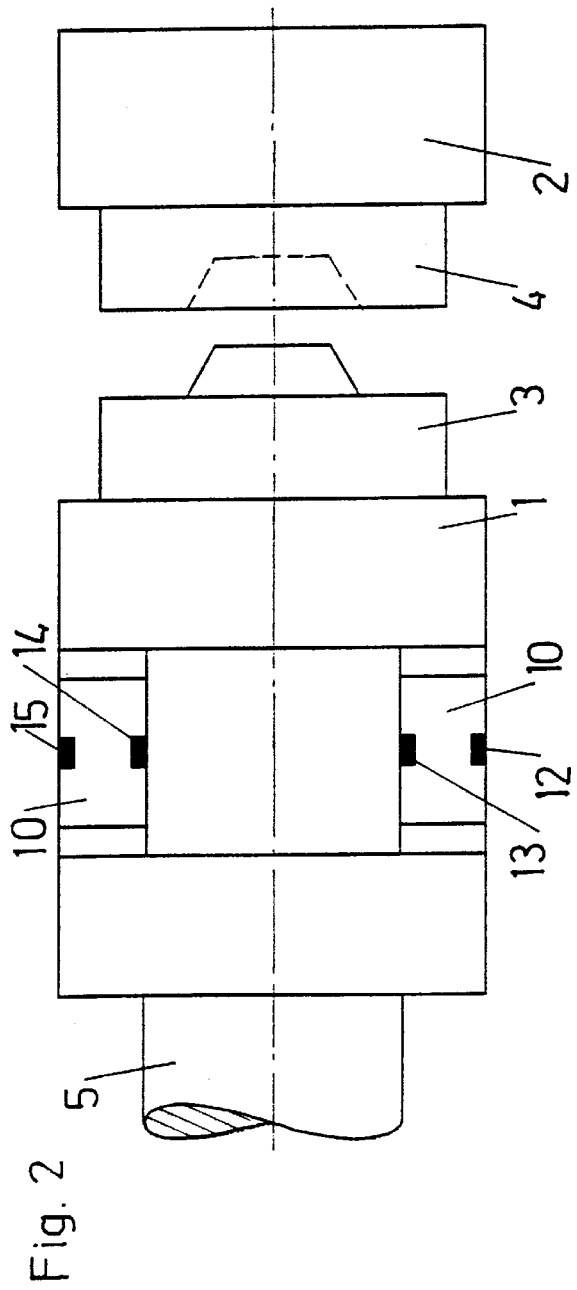
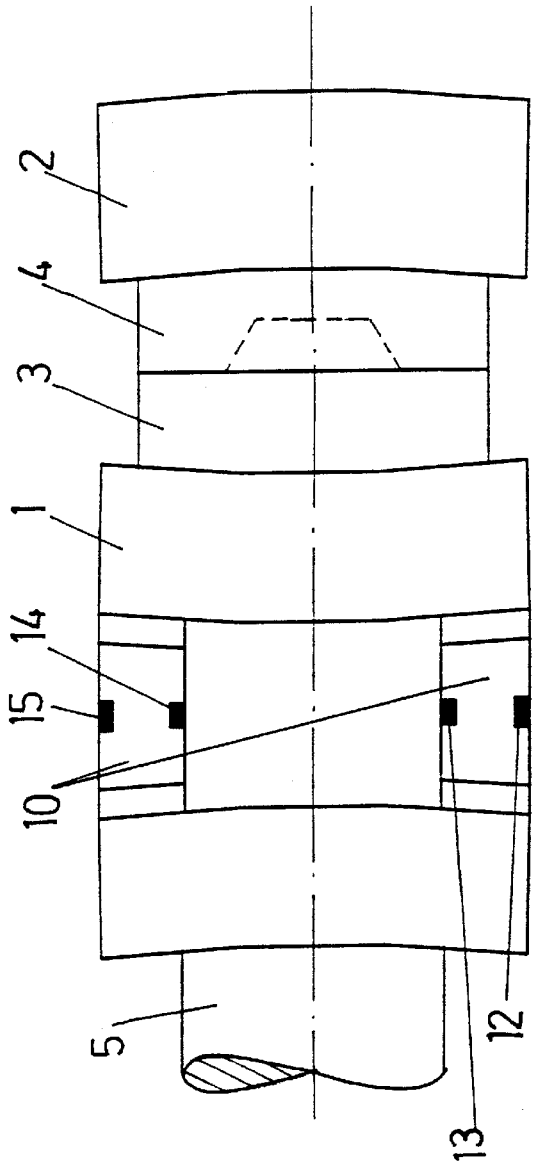

INJECTION MOLDING MACHINE

FIELD AND BACKGROUND OF THE INVENTION

The invention relates to an injection molding machine with a frame which is C-shaped viewed from the side, the legs of which are pushed apart at their free ends by the effect of the locking force, wherein the two die platens associated with the legs are kept parallel in that pivoting occurs between at least one die platen and the associated leg.

Normally (EP 0 311 133 B2) such injection molding machines with beamless mold locking means allow the pivoting of the stationary die platen together with the associated leg of the frame taking up the locking force, wherein a joint between the moveable die platen and the other leg of the frame makes it possible that when the locking force is applied, the moveable die platen is set parallel to the stationary die platen. It is also possible to uncouple the two die platens from the associated legs of the tension frame by means of joints (see DE 295 16 388 U). In both cases, the joints which provide the pivoting can be formed by a bearing with parts which pivot opposite one another (for example rotatable axle pins) or by means of a deformable retaining part, possibly integrated into the machine frame.

In particular with the standard injection molding machines provided with beams, it has long been known to monitor the running of the process, in that the locking force actually applied to the tool is registered by measuring the hydraulic pressure or by measuring the strain on the beam within the locking and opening cycle. Monitoring of the strain on an individual beam is sufficient to protect the mold against pieces mistakenly being left inside the mold and for determining excessive pressure inside the mold, which distends the mold. It is also possible in principle, by simultaneous monitoring of the strain on all four beams, to determine asymmetrical positioning of the edges of the mold or a loading on one side of the mold because of the mold being arranged asymmetrically or not being filled evenly. However, such a determination requires a continuous comparison of differences in the strain on the individual beams occurring for other reasons, so the monitoring of all the beams to determine disturbances in the symmetry of the apparatus or the course of the process has not been achieved.

SUMMARY OF THE INVENTION

Means for measuring the strain on the frame have also already been proposed with injection molding machines without beams (see EP 0 726 131). However, the invention proceeds from the fact that injection molding machines of the type defined in the introduction offer the possibility of determining asymmetry in the loading of the mold by means of measurements on an individual joint. The invention thus relates to the provision of a measuring means for continuous monitoring of the rotation and distortion of the joint providing the pivoting.

This measurement is carried out particularly easily when instead of the rotation about an axle pin being monitored, as is the case in EP 0 311 133 B2, the pivoting of the die platen(s) with respect to the frame is sensed by a deformable retaining piece. In this case, the application of just a single strain gauge in the area deformed by the locking force delivers evidence as to whether asymmetry has occurred in a certain cycle of locking and opening compared to normal circumstances. Normally, in the case of deformable joints, which are provided in the form of a bar running in the longitudinal direction of the machine, a strain gauge would be applied to the upper and lower sides of the bar, in order to be able to distinguish between the compression and the bending of the joint. If two bars are arranged adjacent to one another, the use of four strain gauges allows not only the determination of asymmetry in the direction of pivoting of the joint, but also in the axial direction.

BRIEF DESCRIPTION OF THE DRAWINGS

Details of the invention will be described hereinafter with reference to the drawings. In these is shown in:

FIG. 2 shows a schematic plan view of the area of the mold of this machine in an unloaded state.

FIG. 3 shows the loaded state.

DESCRIPTION OF THE PREFERRED EMBODIMENT

Figure 1:
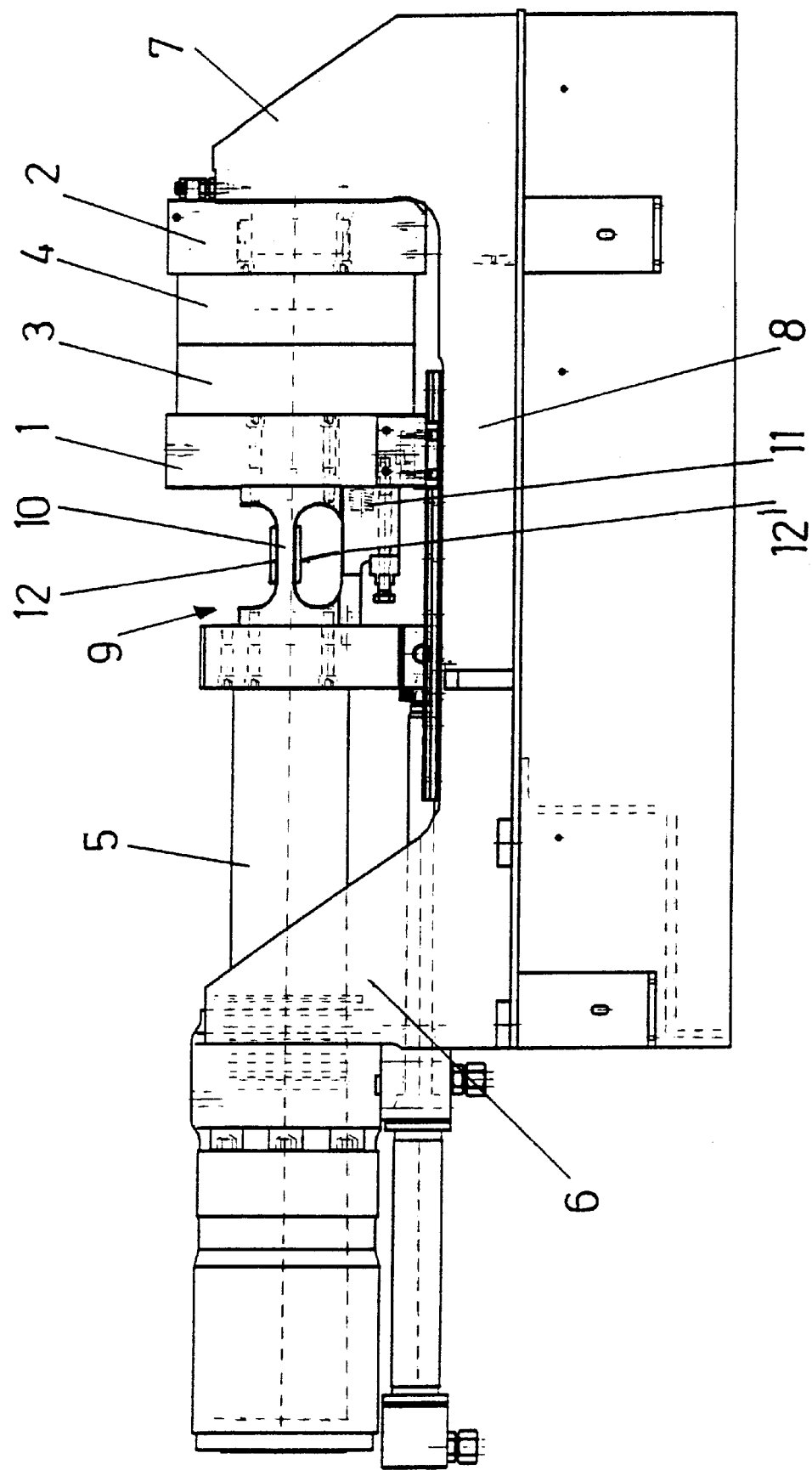
FIG. 1 The side view of the locking means of an injection molding machine.

In FIG. 1 an apparatus for injection molding of plastics is shown, wherein the part of the apparatus for plasticizing and injecting the plastics into the mold has been omitted. The so-called locking unit is shown, which serves to move a moveable die platen 1 away from the stationary die platen 2, and thereby to open the space between the mold-halves 3, 4, and to press the mold-halves 3, 4 together during the injection molding process tightly enough that the mold cannot be opened by the pressure inside the mold.

The drive for the moveable die platen 1, in the present case configured as a hydraulic unit, exerts a force of the magnitude of over 100 tonnes. This force is taken up by longitudinal beams in conventional machines. Such longitudinal beams are absent in the machines according to the invention. Instead, in this case, a C-shaped tension frame takes up the locking force, which frame is composed of two vertical legs 6, 7 and a horizontal web 8. Because of the locking force, the upper ends of the legs 6 and 7 spread apart slightly from one another. In order that the mold remains closed in spite of this, in the present case, the stationary die platen 2 is connected in a fixed manner to the leg 7, and a joint 9 allows the moveable die platen 1 to accompany the slight pivoting of the stationary die platen 2.

The joint 9 is essentially composed of two adjacently arranged supports 10 which are I shaped when viewed from the side, wherein the extension 11 simply has the job of forming a stop when there is excessive pivoting of the die platen 1.

The arrangement of at least one strain gauze 12 on one of the two bars 10 is essential to the invention. It is advantageous to arrange a further strain gauge 12'–15' below at least one of the strain gauges 12–15, so that the compression of the bars 10 can be differentiated from the bending thereof. It would also be possible, per se, to sense extension using just one strain gauge 12, as even one strain gauge allows determination of whether deviations from normal behaviour can be traced back to a relatively greater loading of the upper and lower half-molds. If strain gauges are fitted to the two bars 10, asymmetrical loading of the mold with respect to the vertical central longitudinal plane can also be determined. The arrangement of two strain gauges 12, 13 and respectively 14, 15 on each of the bars 10 moreover allows deformations of the die platen 1, as shown in an exaggerated manner in Fig. 3, to be registered.

The invention was demonstrated using a beamless injection molding machine with a swivel joint. It is applicable in the same manner, however, if a joint is arranged between the two die platens and the associated legs of the frame respectively, wherein it is not dependent on whether the ability of the die platen to pivot is provided by a joint with an axle pin or by the deformation of a flexible part. In each case, it allows the monitoring of a pivoting movement instead of the usual monitoring of rotations and compressions to be carried out with fewer measuring points, and moreover, monitoring as directly as possible of the area of the mold which is of interest.

I claim:

1. Injection molding machine with a frame which is C-shaped viewed from the side, the frame having a pair of legs with free ends which are pushed apart by the effect of a locking force applied between the legs, a die platen associated with each leg, a joint between at least one said die platen and the associated leg for keeping the die platens parallel to each other by allowing the one die platen to pivot with respect to the associated leg by rotation and/or distortion of the joint, and measuring means for continuous monitoring of the rotation and/or distortion of the joint for providing the pivoting.

2. Injection molding machine according to claim 1, wherein the joint (9) has no axle, the measuring means is in the form of strain gauges (12–15, 12'–15').

3. Injection molding machine according to claim 2, wherein one of the strain gauges (12, 12') is arranged on each of upper and lower surfaces of the joint formed by at least one bar (10) extending in a longitudinal direction of the machine.

4. Injection molding machine according to claim 3, wherein the joint is composed of two adjacently arranged bars (16) and the measuring means is composed of at least four strain gauges (12–15).

* * * * *